United States Patent
Kennedy

(10) Patent No.: US 10,401,006 B2
(45) Date of Patent: Sep. 3, 2019

(54) PORTABLE LIGHT TOWER

(71) Applicant: Gino Kennedy, Jacksonville, FL (US)

(72) Inventor: Gino Kennedy, Jacksonville, FL (US)

( * ) Notice: Subject to any disclaimer, the term of this patent is extended or adjusted under 35 U.S.C. 154(b) by 0 days.

(21) Appl. No.: 15/915,907

(22) Filed: Mar. 8, 2018

(65) Prior Publication Data
US 2018/0283662 A1 Oct. 4, 2018

Related U.S. Application Data

(60) Provisional application No. 62/468,780, filed on Mar. 8, 2017, provisional application No. 62/468,790, filed on Mar. 8, 2017.

(51) Int. Cl.
| | | |
|---|---|---|
| F21V 21/22 | (2006.01) | |
| F21V 21/26 | (2006.01) | |
| F21V 21/06 | (2006.01) | |
| F21V 21/24 | (2006.01) | |
| F21L 13/00 | (2006.01) | |
| F21W 131/10 | (2006.01) | |
| B60P 3/18 | (2006.01) | |

(52) U.S. Cl.
CPC .............. *F21V 21/22* (2013.01); *F21V 21/06* (2013.01); *F21V 21/24* (2013.01); *F21V 21/26* (2013.01); *B60P 3/18* (2013.01); *F21L 13/00* (2013.01); *F21W 2131/10* (2013.01)

(58) Field of Classification Search
CPC .......... F21V 21/22; F21V 21/06; F21V 21/26; F21V 21/14–406
See application file for complete search history.

(56) References Cited

U.S. PATENT DOCUMENTS

| | | | |
|---|---|---|---|
| 3,439,467 A | 4/1969 | Partlow | |
| 3,495,364 A | 2/1970 | De Bella | |
| 4,181,929 A | 1/1980 | Barber et al. | |
| 5,524,398 A * | 6/1996 | Miller | B60P 3/18 182/207 |
| 5,709,461 A * | 1/1998 | Michl | F21V 21/24 362/239 |
| 5,765,805 A | 6/1998 | Kennedy | |
| 5,806,963 A | 9/1998 | Miller et al. | |
| 6,047,942 A | 4/2000 | Kennedy | |
| 6,517,225 B1 | 2/2003 | Allen et al. | |
| 6,637,711 B2 * | 10/2003 | Enochs | B66F 7/0666 248/277.1 |
| 6,805,462 B1 | 10/2004 | Smith et al. | |
| 7,621,650 B2 | 11/2009 | Nalitchaev et al. | |

(Continued)

FOREIGN PATENT DOCUMENTS

| | | | | |
|---|---|---|---|---|
| DE | 102009010933 A1 * | 9/2010 | | F21S 6/003 |
| EP | 1870374 A2 * | 12/2007 | | B66F 3/22 |

*Primary Examiner* — Babajide A Demuren
(74) *Attorney, Agent, or Firm* — McHale & Slavin, P.A.

(57) ABSTRACT

Disclosed is a compact portable light tower that can be stacked or nested. The light tower employs a scissors lift mechanism to raise a set of bar lights from a housing having a height of about 28" and a length of about 60", to an extended height of about 360". The scissors lift is extended and retracted by use of a linear actuator. Batteries or an engine/generator assembly is employed for operation of the actuator and light bar. The housing can be stacked for ease of storage and transportation. Outriggers provide stabilization of ground engagement.

10 Claims, 6 Drawing Sheets

(56) References Cited

U.S. PATENT DOCUMENTS

| | | | | |
|---|---|---|---|---|
| 7,631,848 B2* | 12/2009 | Enochs | ................ | B66F 7/0666 |
| | | | | 248/277.1 |
| 8,303,143 B2 | 11/2012 | Webb | | |
| 8,439,534 B1 | 5/2013 | Roe et al. | | |
| 9,567,899 B2* | 2/2017 | McKinley | ............. | F02B 63/047 |
| 9,598,875 B1* | 3/2017 | Bateman | ............... | E04H 12/182 |
| 2002/0185637 A1* | 12/2002 | Enochs | ................ | B66F 7/0666 |
| | | | | 254/266 |
| 2009/0091930 A1* | 4/2009 | Probasco | ................ | F21S 8/028 |
| | | | | 362/235 |
| 2010/0213338 A1* | 8/2010 | Enochs | ................ | B66F 7/0666 |
| | | | | 248/327 |
| 2012/0201015 A1* | 8/2012 | Robertson | ................ | F21L 4/08 |
| | | | | 362/183 |
| 2015/0280489 A1* | 10/2015 | Curlett | ..................... | H02J 7/14 |
| | | | | 307/66 |
| 2015/0330558 A1* | 11/2015 | Intravatola | ............. | F16M 11/24 |
| | | | | 362/184 |
| 2016/0309566 A1* | 10/2016 | Fletcher | ............. | H05B 37/0227 |

\* cited by examiner

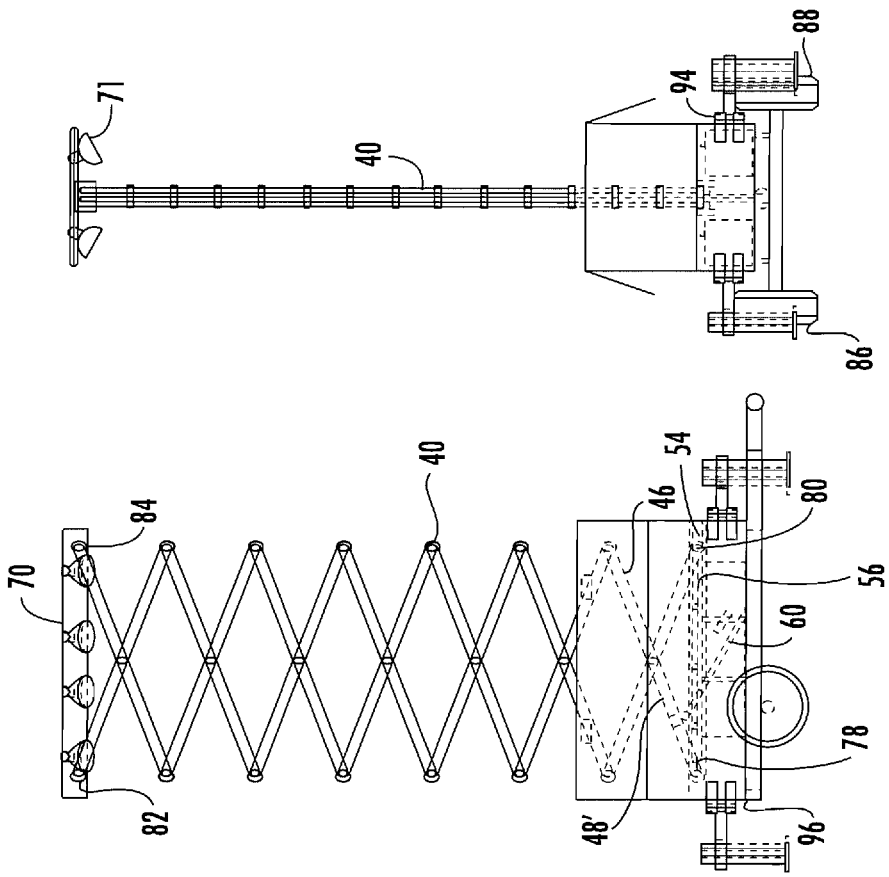
FIG. 6
FIG. 5
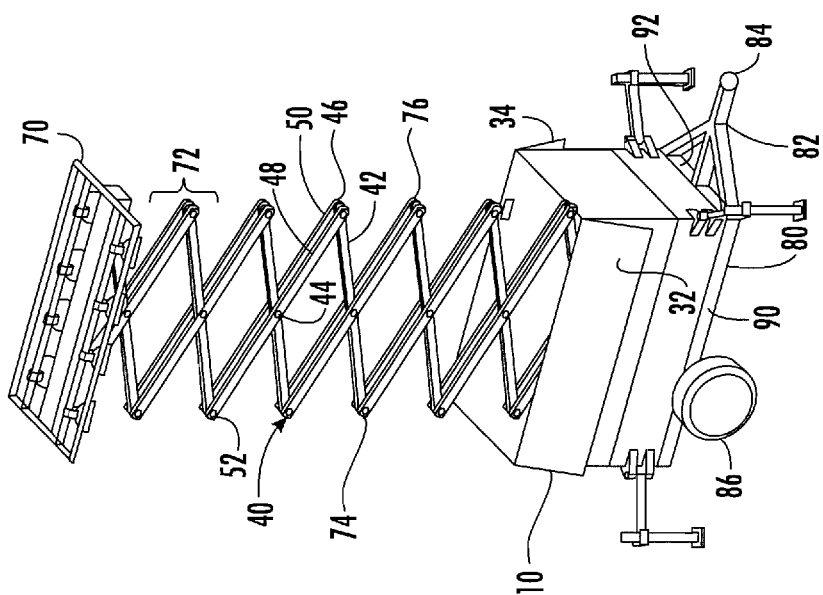
FIG. 4

PORTABLE LIGHT TOWER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/468,790 entitled "Portable Light Tower", filed on Mar. 8, 2017 and U.S. Provisional Patent Application No. 62/468,780 entitled "Light Tower with Vertical Actuator", filed on Mar. 8, 2017, the contents of which is incorporated herein by reference in its entirety.

FIELD OF THE INVENTION

The instant invention relates to portable light towers and more specifically to a light tower employing a scissors lift for lighting.

BACKGROUND OF THE INVENTION

Portable towers typically employ a telescoping mask which extends upwardly from a portable base to support a bank of lights overhead to temporarily illuminate an area in low lighting conditions. Typically the area to be illuminated lacks electrical power wherein the portable light towers have their own source of power such as batteries or an engine/generator system. The area to be illuminated is in need of lighting wherein the self-powered portable light tower provides sufficient illumination to sites such as building construction, highway construction, carnivals, outdoor sporting and recreational activities, and the like. Portable light towers are well known in the art and typically include wheels for ease in transporting.

Various types of mast extensions are also known in the art. Typically the mast is a telescoping pole that is limited in height extension by the length of individual mast sections which must fit within adjoining mast sections leading to more costly designs due to the need for individual parts that are not exchangeable. Prior art disclosures include portable lighting systems exemplified in U.S. Pat. Nos. 3,439,467; 3,495,364; 4,181,929; 5,806,963; 6,517,225; 6,805,462; 7,621,650; 8,303,143; and 8,439,534.

Present light towers lack compact storage features which can affect shipping as well as storage. Light towers can be trailer mounted and towed to a deployment site or placed in position by a fork lift. The need to transport multiple light towers is typically by flatbed where they are offloaded at the jobsite. For instance, if a carnival requires ten light towers then it necessary to transport light towers by the use of ten vehicles, or place as many towers on a flatbed trailer as physically allowed. Placing multiple light towers on a single large common trailer, such as a flatbed, is limited to the length and width of the flatbed. Furthermore, placing multiple light towers mounted on a flatbed or on a single large common trailer is limited since all known prior art light towers have no provision for nesting or stacking. Existing light towers lack compact storage features which can also cause problems in storage.

What is lacking in the industry is an improved light tower having a scissors type lift making the unit compact to allow benefits in both storage and shipping.

SUMMARY OF THE INVENTION

A compact portable light tower employing a scissors lift mechanism to raise a set of bar lights from a housing having a height of about 28" and a length of about 60", to an extended height of about 360". The scissors lift is extended and retracted by use of a linear actuator. Batteries or an engine/generator assembly is employed for operation of the actuator and light bar. The engine/generator assembly eliminates the weight of a conventional bedplate by couplings The housing includes a hinged top for protecting the assembly during storage. The housing can be stacked and includes outriggers to provide stabilization of ground engagement. A trailer can be Accordingly, it is an objective of the instant invention to provide a portable light tower utilizing a scissor mechanism for lifting a light bar.

It is another objective of the instant invention to provide a portable tower trailer having a stackable frame and stackable light towers which are constructed and arranged for compact storage and shipping.

Still another objective of the instant invention is to provide a portable tower trailer having a light tower including a generator attached to an engine to eliminate the weight of a conventional bed plate.

Another objective of the instant invention is to provide a portable tower trailer having members constructed and arranged to support like shaped portable tower trailers or light towers in a stacked configuration that can be fastened together for shipping.

It is an objective of the instant invention to provide a portable tower trailer having a light tower that eliminates the need for placing multiple light towers on a single large common trailer, such as a flatbed, where space is limited to the length and width of the flatbed. Multiple light towers can be towed on the portable tower trailer by a vehicle in a stackable or nesting fashion.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 4 is a perspective view of the light tower partially expanded;

FIG. 5 is a side view of FIG. 4;

FIG. 6 is an end view of FIG. 4;

DETAILED DESCRIPTION OF THE INVENTION

Figure 1:
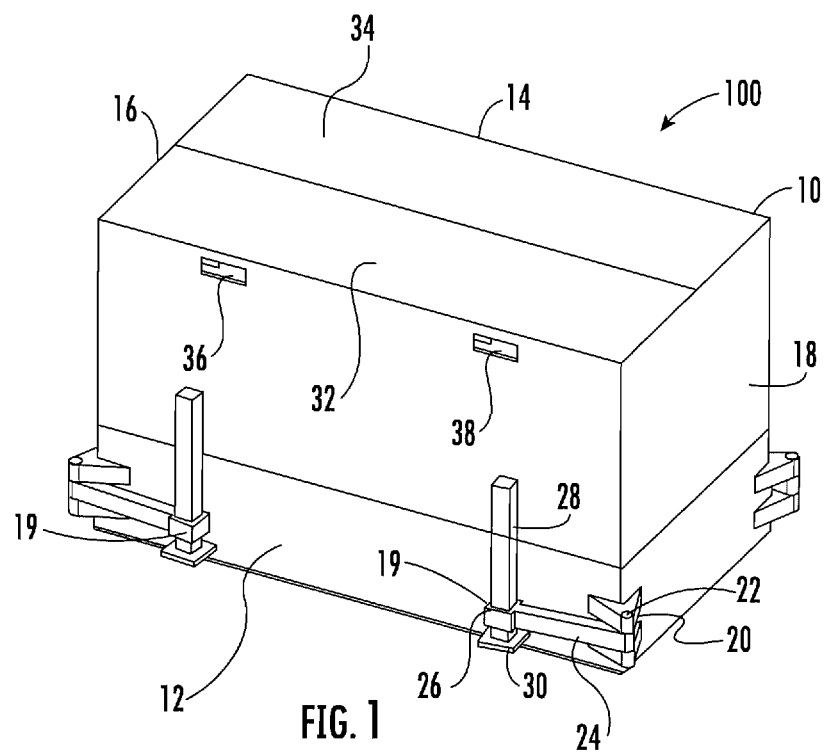
FIG. 1 is a perspective view of the light tower in a storage position.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
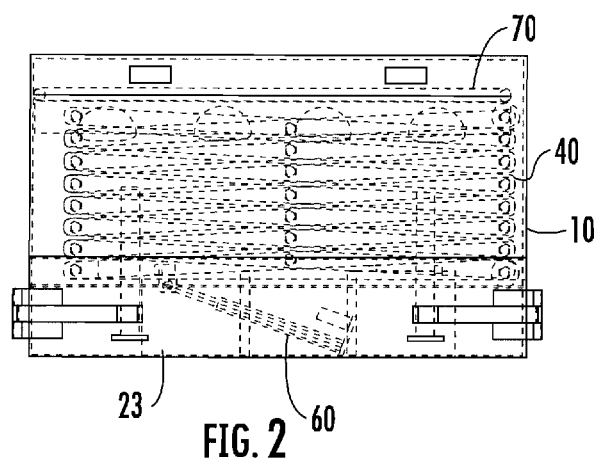
FIG. 2 is a cross sectional side view of FIG. 1 depicting a linear actuator used for extending/retracting the scissor mechanism.
Figure 3:
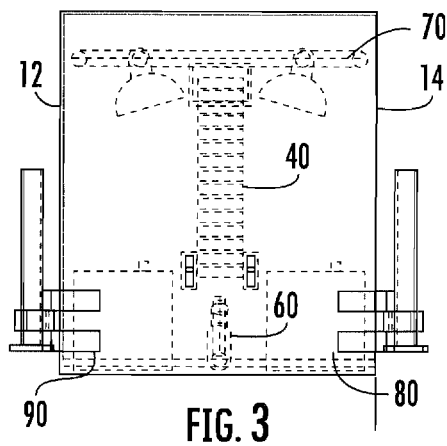
FIG. 3 is an end view of FIG. 1.

Referring now to Figures, set forth is a portable lift housing 10 defined by a left side wall 12, a right side wall 14, a first end wall 16 and a second end wall 18. Along the corners of the housing are located outriggers 19 for use in lifting the housing 10 off the ground, as well as for use in stabilizing the housing 10 for uneven ground placement. Each outrigger 19 has a base 20 secured to the housing 10. A displacement arm 200 is pivotally coupled to the base 20 by a pivot pin 22. A distal end of each outrigger 19 includes a square shaped aperture 26 allowing the slidable extension of a stand member 28 having a footer base 30. The outriggers 19 depicted in FIG. 1-3 are adjustable by use of pins or bolts, not shown. A bolt can frictionally engage the stand while a pin can be placed into apertures to be located along the length of the stand 28. The outriggers 19 allow for incremental height adjustment of each corner. The housing 10 has a bottom wall 23 and the upper portion of the housing has a left-hinged lid 32 and a right-hinged lid 34. To access the interior of the housing, the lids 32, 34 can be rotated into an open position. Side walls 12 and include lifting point apertures 36 and 38 for use in conjunction with a forklift. Alignment sleeves 41 are preferably positioned along each bottom corner formed by the sidewalls to provide ease of nesting with an adjoining housing.

FIG. 2 is a cross-sectional side view of the portable light tower 100 wherein a scissor jack assembly 40 is mounted along a center axis of the housing 10. The scissor jack assembly 40 is coupled to a linear actuator 60 angularly positioned to effectuate a lift to the individual bars that form the assembly. In the embodiment depicted, a scissor jack assembly 40 fits within the housing 10 having a length of about 60 inches. The linear actuator sized to generate a force of two to three thousand pounds of force and is positioned at an angle of about 45° to create a lifting force capable of moving the scissor jack assembly 40 having a weight of about 300 lbs upward to a height of about 360 inches. The scissors jack assembly 40 of this embodiment mechanism will use between seven and nine adjoining bars, which will lift a light bar 70 up to about 30 feet high. The linear actuator 60 has a length of about 20" in a collapsed position with a desired stroke of 10"-12". While the preferred angle of employment for the actuator is 45 degrees, the actuator can be mounted anywhere from a horizontal position to a vertical position. Alternatively a screw, hydraulic, or the like actuator can be employed.

A battery bank 80 of AGM type batteries is depicted along one side of the housing. The power source may be a bank of batteries that can be recharged. In this embodiment, LED flood light fixtures 71 are preferably coupled to AGM type batteries. The light bank may include halogen, metal halide fixtures, LED or any other flood light bank. Mono-crystalline type module solar panels, not shown, can be mounted to the inner or outer surface of the lids 32, 34 for use in recharging the batteries with sunlight.

Alternatively a generator/engine assembly may be placed within the housing, preferably Applicant's generator/engine combination that eliminates conventional base plate which otherwise add hundreds of pounds to a conventional generator/engine assembly. U.S. Pat. Nos. 5,765,805 and 6,047,942 discloses the preferred generator/engine assembly which is capable of providing a high electrical output with minimal size and weight, the contents of these patents are incorporated herein by reference. By use of a lightweight generator/engine assembly both the weight and the size of the stackable towers can be reduced when used with lighting elements.

Figure 9:
FIG. 9 is an end view of FIG. 7.
Figure 8:
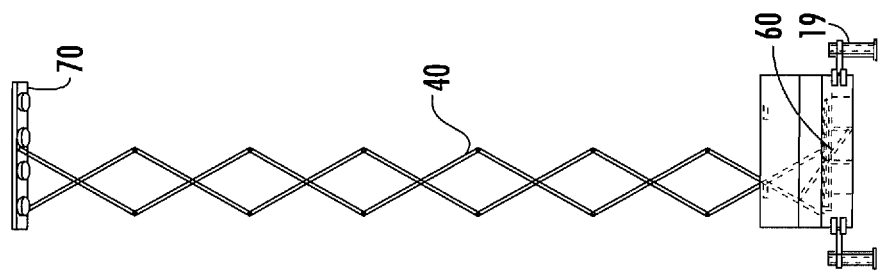
FIG. 8 is a side view of FIG. 7.
Figure 7:
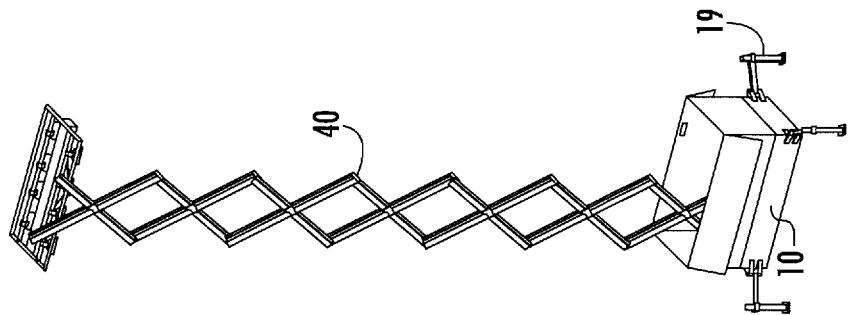
FIG. 7 is a perspective view of the light tower fully expanded.
Figure 10:
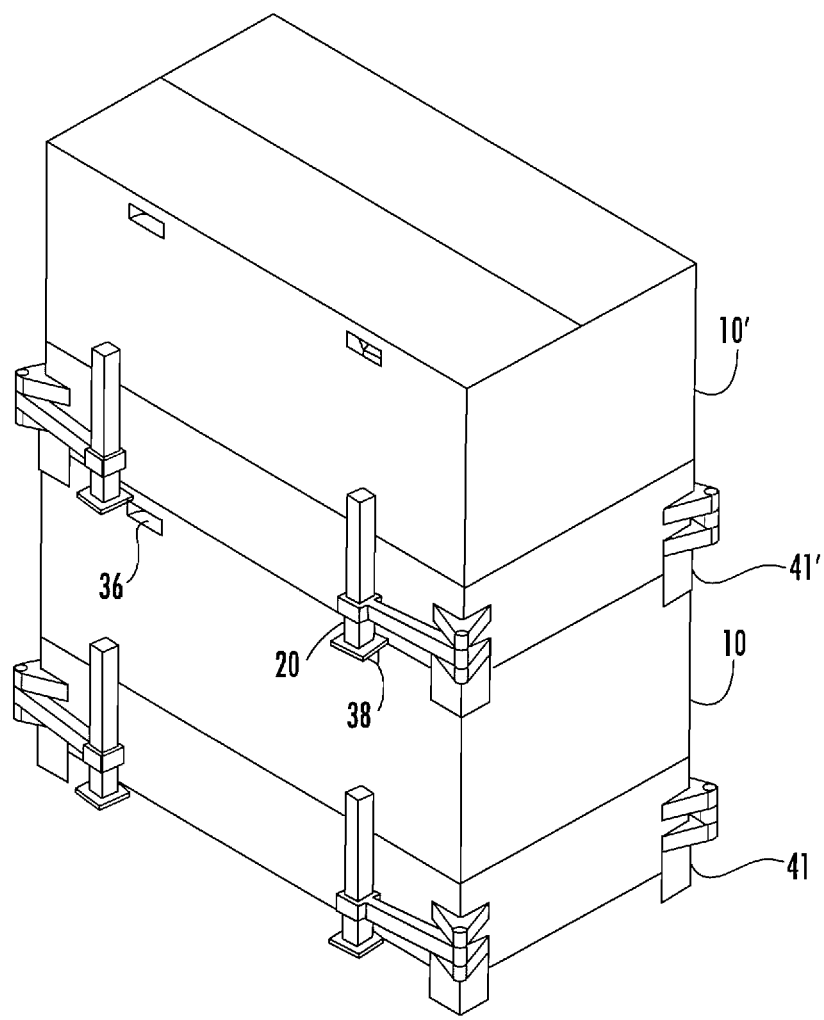
FIG. 10 is a perspective view of the light tower in a stacked storage position.

Referring to FIGS. 4-9, the covers 32 and 34 may be rotated into an open position and the linear actuator 60 operated so as to lift the scissors mechanism 40. The scissors mechanism consisting of spreader bar 42 having a centrally disposed pivot point 44 with first end 46 adjoining pivot bars and 50 positioned along an articulation point allowing the linear actuator to change the angle of the bars in relation to the force expended by the actuator as the bars are moved upward. The opposite end of the spreader bars 48 and 50 include pivot point 52, which adjoins another spreader bar 42 so as to cause the scissors jack to extend upward from the base of the housing. The linear actuator 60 pushes against the lower spreader bars 46' and 48' wherein an aligning edge 54 is drawn along a directional slot 56 so as to allow the ends of the bars to be brought together as the light bar is extended upward. FIGS. 4-6 depict the linear actuator as it is projected about 6" of stroke, and FIGS. 7-9 depict the linear actuator 60 with approximately 12 inches of stroke extended, causing the light bar 70 to be raised approximately 30 feet.

The disclosure illustrates seven stacks of bars that fit within the 60" long housing 10. Heights greater or less can be accomplished by using more or less stacks of bars, and the length of the bar stacks may also be longer or smaller. The housing 10 can be placed on a trailer 80, depicted in FIGS. 4-9, having a tongue 82 and hitch 84, with wheels 86 and 88. The trailer 80 consists of four support walls 90, 92, 94 and 96 which provide a base for support of the housing 10 for ease of transportation. In this manner, the individual housings 10 can be stacked on top of each other, as depicted in FIGS. 10-13 wherein the outriggers 19 can be lowered into a position so as to engage the side wall of a lower housing, or placement within the lifting points 36 and 38 so as to further secure stacked housings. The scissor jack assembly comprises a plurality of stacked scissor bar assemblies 72 hingedly connected one to the other along a first end 74, a center point 44, and a second end 76; a bottom scissor bar assembly having a first portion 78 of the lower end pivotally coupled to the bottom wall 23 of the housing and a second portion 80 of the lower end slidably secured to the bottom wall slot 56, an upper scissor bar assembly having a first portion 82 of the upper end pivotally coupled to the a light bar 70 and a second portion 84 of the upper end slidably secured to the bottom of the light bar 70.

Figure 12:
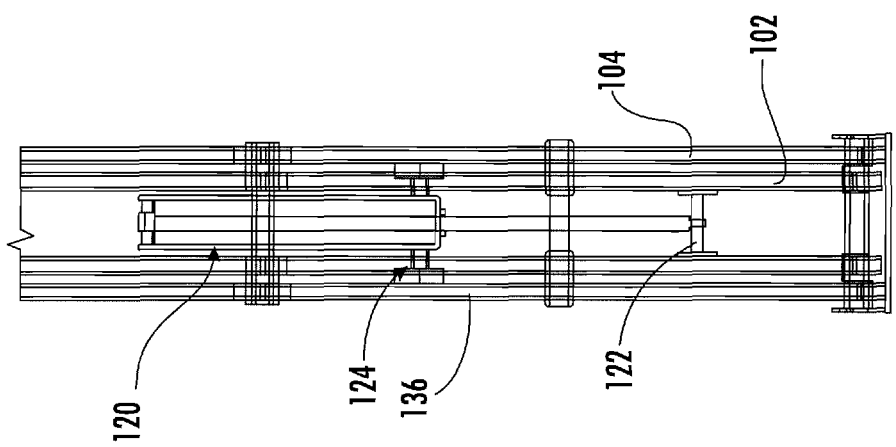
FIG. 12 is an end view of FIG. 11.
Figure 11:
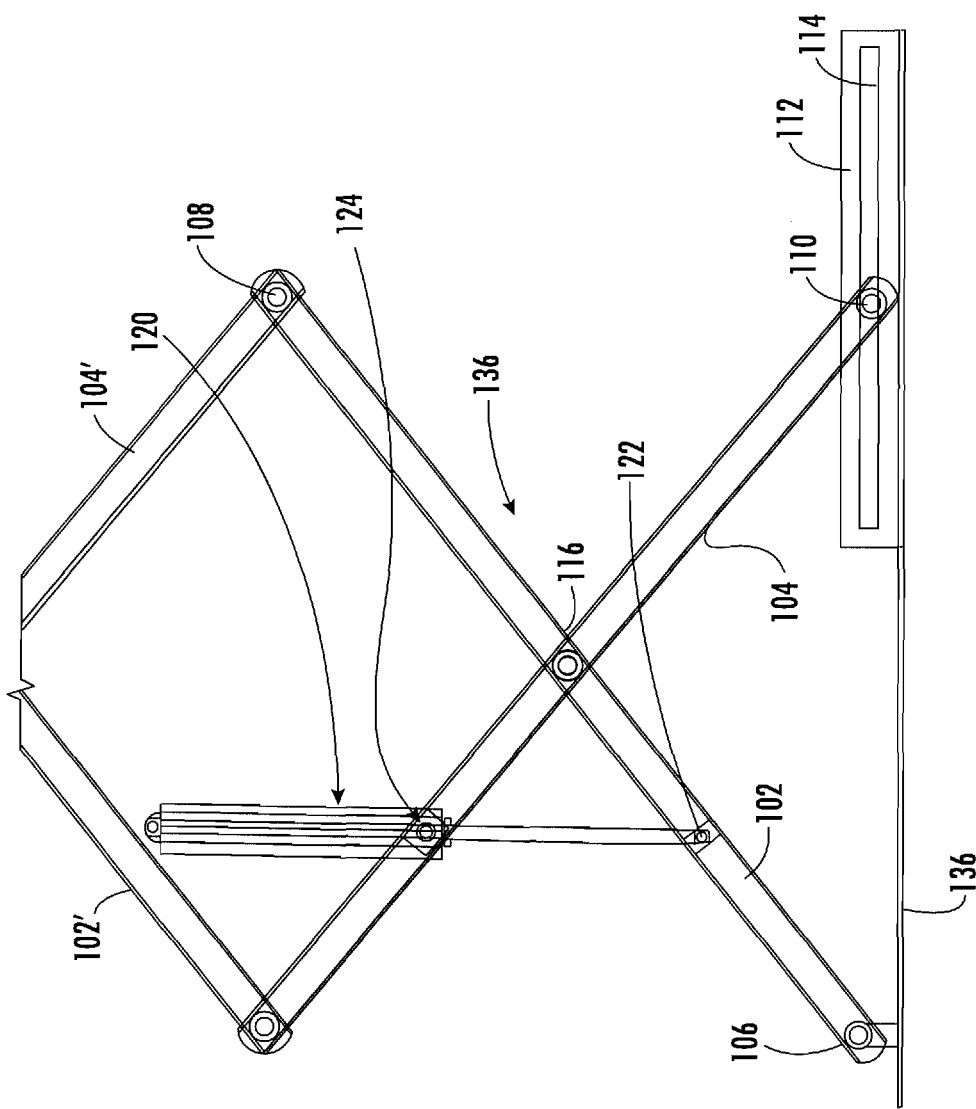
FIG. 11 is a side view depicting a linear actuator used for extending/retracting the scissor mechanism.

FIGS. 11 and 12 illustrate an alternative embodiment wherein a vertical actuator 120 is mounted between a support bar 102 along a lower connection point 122 and a spreader bar 104 along upper connection point 124. By separating the support bar 102, the vertical actuator 120 can be positioned between the support bar and the spreader bar. The actuator 120 in this embodiment operates in a pulling action to raise the lights and in a pushing action to collapse the lights into a storage position. In this embodiment the scissors mechanism 136 consists of a plurality of support bars 102 that are pivoted coupled to a pair of spaced apart spreader bars 104. In one embodiment, a total of seven support bars 102 are used in combination with an equal amount of spaced apart spreader bars. It should be noted that the length and quantity of bars can be altered and are considered within the scope of this invention. The vertical linear actuator 120 engages the lower support bar and as the actuator 120 is extended, the support bar 102 is angled upward as it pivots along coupled 106 which is mounted to the floor. The opposite end 108 of the support bar 102 is positioned between adjoining spaced apart spreader bars 104'. The primary spreader bar 104 has a proximal end 110 that is placed on either side of a slotted bracket 112 secured to the floor. The slotted bracket includes an elongated slot wherein a coupling 110 used to secure the proximal ends of the spreader bars 104 together can freely traverse as the spreader bar 102 is angled upward. The support bar 102 and the spreader bar are further pivotally coupled at a midsection 116 which allows the scissors action for rising in the light bar in response to the actuator movement.

Figure 13:
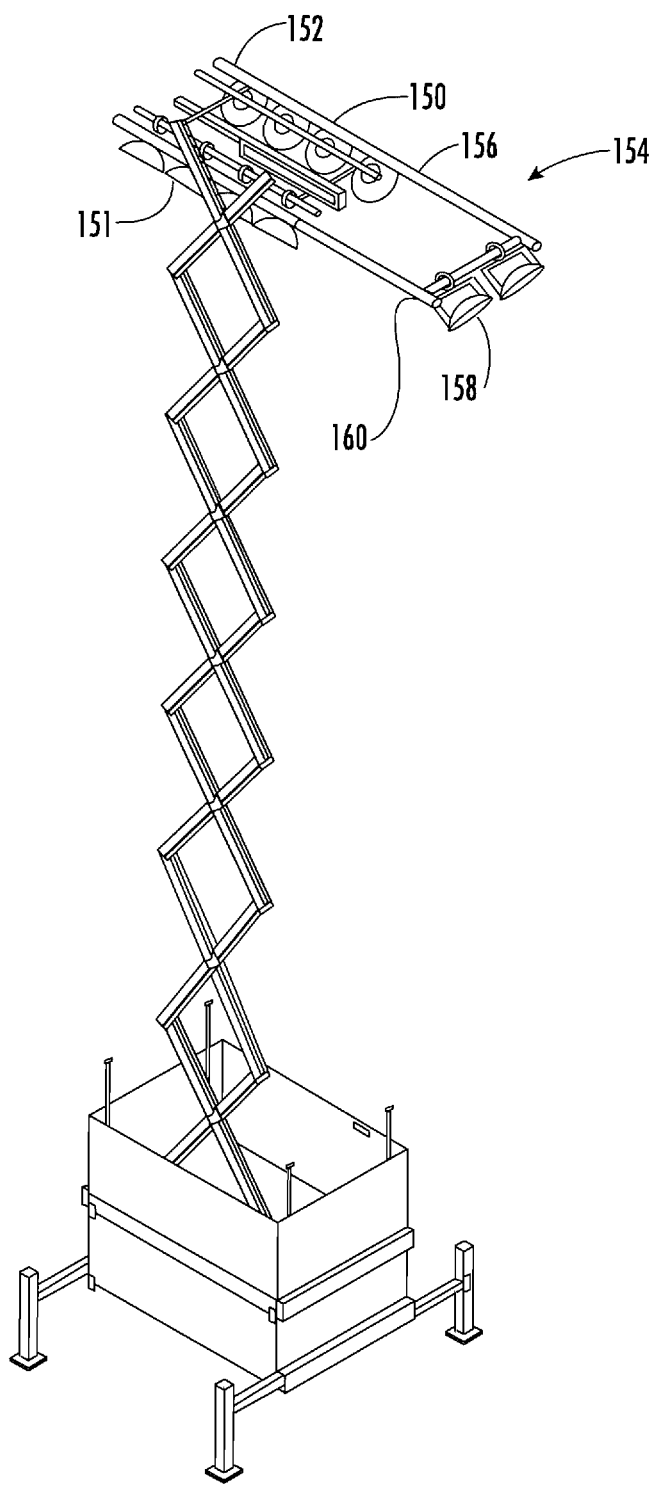
FIG. 13 is a perspective view of a telescoping platform.

FIG. 13 depicts an optional telescoping platform 150. The platform 150 consists of a base comprising either square or round tubing 152 with an extendable section 154 having square or round tubing 156 that is slidably insertable into the base tubing 152. A lighting device 158 can be positioned on the end 160 of the extendable section 154 providing a light source a distance from the light bar 151.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A portable light tower comprising:
    a housing formed from a flat bottom wall, a top formed from a flat left-hinged lid and a flat right-hinged lid, and side walls defining four corners, each said corner including an alignment sleeve constructed and arranged for stacking or nesting with a similar shaped housing;
    the alignment sleeve secured to each said corner between said flat bottom wall and said side walls;
    an outrigger secured to each said corner of said housing, said outrigger having a first end of a displacement arm pivotally coupled to said housing and a second end having an aperture allowing a vertically disposed extendable stand member to provide corner height adjustment;
    a scissor jack assembly mounted within said stackable housing, said scissor jack assembly formed from a plurality of bars each hingedly connected together at a first end, a center point, and a second end; said scissor jack assembly having a bottom bar slidably secured to said housing and an upper bar attached to a light bar;
    an actuator have a first end secured to said housing and a second end secured to said bottom bar, said actuator constructed and arranged to extend and retract said light bar a vertical distance above said housing; and
    a power source for operating said actuator and said light bar.

2. The portable light tower according to claim 1 wherein said actuator is linear.

3. The portable light tower according to claim 1 wherein said actuator is mounted between a horizontal position and a vertical position.

4. The portable light tower according to claim 1 wherein said actuator is mounted at about a 45 degree angle relative to a vertical position.

5. The portable light tower according to claim 1 wherein said light bar includes a telescoping member for extending the position of at least one lighting device.

6. The portable light tower according to claim 1 including an electrical generator having an internal combustion engine mounted within said housing and electrically coupled to said light bar.

7. The portable light tower according to claim 6 wherein said electrical generator is directly mounted to said internal combustion engine to eliminate the need for a baseplate.

8. The portable light tower according to claim 1 including a plurality of batteries mounted within said housing and electrically coupled to said light bar.

9. The portable light tower according to claim 1 wherein said at least two side walls of said housing include lifting point apertures positioned along an upper portion of said housing for use in conjunction with a forklift.

10. The portable light tower according to claim 1 wherein said housing is releasably secured to a trailer.

\* \* \* \* \*